(12) United States Patent
Bhandari et al.

(10) Patent No.: US 10,436,198 B2
(45) Date of Patent: Oct. 8, 2019

(54) LOW POWER CONSUMING MODULE FOR A VACUUM PUMP

(71) Applicant: PADMINI VNA MECHATRONICS PVT. LTD., Gurgaon (IN)

(72) Inventors: Kabir Bhandari, Gurgaon (IN); Rajesh Kumar Sahoo, Gurgaon (IN); Sumit Rajpal, Gurgaon (IN)

( * ) Notice: Subject to any disclaimer, the term of this patent is extended or adjusted under 35 U.S.C. 154(b) by 196 days.

(21) Appl. No.: 15/539,129

(22) PCT Filed: Dec. 22, 2015

(86) PCT No.: PCT/IB2015/059881
§ 371 (c)(1),
(2) Date: Jun. 22, 2017

(87) PCT Pub. No.: WO2016/103177
PCT Pub. Date: Jun. 30, 2016

(65) Prior Publication Data
US 2017/0350392 A1    Dec. 7, 2017

(30) Foreign Application Priority Data

Dec. 22, 2014  (IN) ............................ 3817/DEL/2014
Apr. 14, 2015  (IN) ............................ 1044/DEL/2015

(51) Int. Cl.
*F04C 18/344*     (2006.01)
*F16D 1/04*       (2006.01)
(Continued)

(52) U.S. Cl.
CPC ...... *F04C 18/3441* (2013.01); *F01C 21/0881* (2013.01); *F04C 25/02* (2013.01);
(Continued)

(58) Field of Classification Search
CPC ........................ F01C 21/0881; F04C 29/028
See application file for complete search history.

(56) References Cited

U.S. PATENT DOCUMENTS 8,833,338 B2 *   9/2014   Pekrul ................... F01C 1/3445
                                              123/231
2019/0101117 A1 *  4/2019   Ikeda .................... F04C 29/028

FOREIGN PATENT DOCUMENTS

EP            1614900 A2 *  1/2006  .............. F01C 21/08

* cited by examiner

*Primary Examiner* — Mary Davis
(74) *Attorney, Agent, or Firm* — Sinorica, LLC

(57) ABSTRACT

The present invention provides an improved vacuum pump assembly for a motor vehicle comprising of a housing, a rotor, modified vane, a sealing ring, a cover, wherein, the modified vane containing a vane slider is having at least one oil vent or relief hole or slot, for the reduction of the exit port oil peak pressure, by channelizing oil supplies to the vane top and bottom face, thereby improving the seal-ability between the moving and stationary part of the pump; and the modified vane further having an oil vent control at the exit port, for maintaining oil pressure and reducing the exit port hydraulic pressure, leading to reduction in the opposite end vane slider tip load causing low friction between the pump housing, the vane and vane slider, and further channelizing the excess amount of oil to the vane top face which creates additional sealing between the vane and the housing, reducing the air leakage between the low pressure chamber and high pressure chamber inside the pump.

8 Claims, 11 Drawing Sheets

(51) Int. Cl.
*F01C 21/08* (2006.01)
*F04C 25/02* (2006.01)
*F04C 29/00* (2006.01)
*F04C 29/02* (2006.01)

(52) U.S. Cl.
CPC ........ *F04C 29/0021* (2013.01); *F04C 29/028* (2013.01); *F16D 1/04* (2013.01)

LOW POWER CONSUMING MODULE FOR A VACUUM PUMP

FIELD OF THE INVENTION

The present invention relates to a low power consuming module for a vacuum pump. More particularly, this invention relates to a method of reducing power consumption and running torque in a vacuum pump of a motor vehicle by virtue of modified vane having single or multiple pressure relief hole/slot.

BACKGROUND OF THE INVENTION

Brake system is one of the most important and essential parts of a motor vehicle which is to be maintained for the safety of passengers inside the vehicle and for the safety of others on the road. In general the brake system comprises of a brake pedal, a power brake booster, a master cylinder, hydraulic lines, wheel cylinder and disc brakes and/or drum brakes. A vacuum pump is present in the brake system to provide the vacuum power. The vacuum pump is activated continuously when the engine starts and supplies vacuum to the break booster. Power brake booster provides the pneumatic boosting to enhance the force from the brake pedal by utilizing the pressure difference between the vacuum chamber and the working chamber. The force thus generated pushes the disc brakes and/or drum brakes to generate an adequate braking force for the vehicles.

One of the main advantages of using the vacuum brake system in a motor vehicle is to provide the required force at the brakes of a motor vehicle. When a driver presses the brake pedal they will feel assistance from the braking system without which the brake pedal would feel very hard. The pump provides higher amount of vacuum whenever it is required. Normally the pressure comes from negative to atmospheric in the brake booster when heavy braking is applied, which further causes a decrease in amplification during braking. This condition of high pressure in the brake booster during the condition of heavy braking is removed by using an auxiliary vacuum pump which can maintain, or even increase the amplification during a heavy braking phase.

During operation of the vacuum pump, oil is drawn from the oil reservoir and fed in to the vacuum pump. This oil feed creates a sealing between the moving part and the stationary part and helps to suck the air from the booster. When the vacuum pump is in working condition the inlet oil enters from the engine oil gallery to the pump through the oil orifice channel and create lubrication and sealing. At the same time from the pump inside pressure chamber the oil pressurized and it goes out to the reservoir through the reed valves. The oil flow rate from the oil reservoir is controlled by the oil pump. After reaching the booster in full vacuum the pump still rotates and the oil flow also continues in to the pump. The vane pushes the oil continuously from the pressure chamber to go out. This compression of oil creates lot of hydraulic resistance forces up on the vane. Due to this higher hydraulic force on the vane the vane tip load increases and frictional losses occur which reduces the pump life. It also consumes higher mechanical driving power from the driving shaft of the engine to operate the pump. In this case the usual vacuum pump takes extra power from the engine.

In the other hand seal ability of top and bottom face of the vane with housing pocket bottom face and pump cover is very important to avoid leakage between moving and stationary body and to increase vacuum efficiency of the pump. The better is the sealing the lesser the air leakage between the pump chamber and the higher the efficiency of the pump. The present invention also improves the seal ability of the vane and the stationary part inside the pump chamber and increases the vacuum generation efficiency of the pump.

For the reliability of the vacuum braking system more accurate vacuum pressure system is needed.

Therefore, there is a need for a reliable and efficient vacuum pump system which reduces the power losses in the ideal working condition and work for long life.

OBJECT OF THE INVENTION

The main object of this invention is to provide a low power consuming module in vacuum pump of a motor vehicle.

Yet another object of this invention is to provide an improved configuration of a vacuum pump with low friction apparatus in a motor vehicle.

Yet another object of this invention is to provide a modified vane having single or multiple pressure relief hole/slot in a vacuum pump.

Yet another object of this invention is to provide an improved vacuum pump in the motor control apparatus of a motor vehicle, which consumes less power.

Yet another object of this invention is to reduce the premature wear of the vane slider of a vacuum pump.

Yet another object of this invention is to provide an improved vacuum pump having well managed hydraulic oil inside the pump.

Yet another object of this invention is to optimize oil supply in to the pump such that the oil pump efforts are reduced thus resulting in low power consumption.

Yet another object of this invention is to provide a method of reducing power consumption and running torque in a vacuum pump of a motor vehicle.

Yet another object of this invention is to provide an improved vacuum pump having less friction between the vane and the housing.

Yet another object of this invention is to get better life of a vacuum pump.

Yet another object of this invention is to provide an improved vacuum pump to reduce the peak force at the maximum compression point.

Still another object of this invention is to provide an improved vacuum pump having optimized oil flow rate from the pressurized oil reservoir.

SUMMARY OF THE INVENTION

The present invention relates to an improved vacuum pump of a motor vehicle. The invention provides for a method of reducing power consumption and running torque in the vacuum pump of a motor vehicle. The modified vane of the vacuum pump results into lesser friction loss by implementing the new feature for oil and friction management within the vacuum pump assembly.

In one aspect, the present invention achieves the above objects by the introduction of modified vane with oil vent for the reduction of the exit port oil peak pressure. This causes the reduction of frictional losses between the vane tip and the housing wall. In addition to this, the bypass oil supplies to the vane top and bottom face improves the seal ability between the moving and stationary part of the pump. This results into low torque to operate the pump and causes low power consumption. The oil flow regulation can be done through various ways like hole at the top side of the vane or bottom side of the vane or both. The passage in the vent can be made to connect both the recesses of the vane from the pressure to the suction chamber as well.

In another aspect of the present invention, the vane with oil vent control the exit port oil pressure and helps to reduce the exit port hydraulic pressure. This leads to a reduction in the opposite end vane slider tip load which causes low friction between the pump housing and the vane and vane slider. Additional advantage is this excess amount of oil is passed to the vane top face which creates additional sealing between the vane and the housing. The sufficient amount of lubrication and oil film reduces the air leakage between the low pressure chamber and high pressure chamber inside the pump. This action increases the vacuum efficiency of the pump. The resulted less tip load improves the life of the pump by reducing wear between the housing and vane slider. Due to the reduction of pump exit port pressure, the power required for pump operation is less which ultimately increases the engine fuel economy. Due to the oil bypassing from the exit port, the peak pressure reduces which ultimately reduces the peak torque. Reduction of peak torque results in reduction of total power consumption of the pump.

The present invention utilizes the combined effects of less friction between the vane slider and the housing and optimized oil flow rate from the pressurized oil reservoir. This combined effects result in less power consumption and running torque in more efficient and effective way over the existing vacuum pumps.

Various general and specific objects and advantages of the invention will become apparent when reference is made to the following description of the invention considered in conjunction with the related drawings.

BRIEF DESCRIPTION OF THE DRAWINGS

A complete understanding of the system and method of the present invention may be obtained by reference to the following drawings.

DESCRIPTION OF THE PREFERRED EMBODIMENT

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art.

Figure 1:
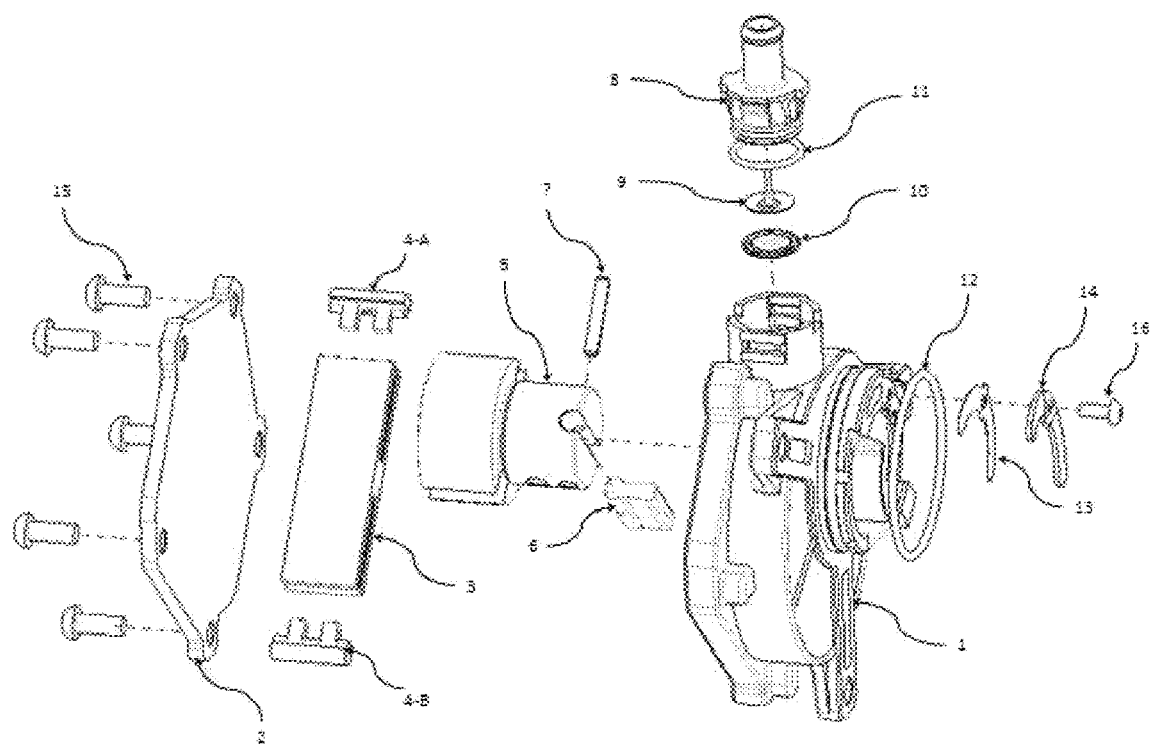
FIG. 1 is an exploded view of a conventional vacuum pump.

As shown in FIG. 1, an exploded view of conventional vacuum pump is illustrated. The vacuum pump comprises a casing or housing 1 provided with a rotor 5 and a vane 3. The vane 3 having vane slider 4 is slidably supported in a recess of the rotor 5. The Housing 1, rotor 5, vane 3 and vane slider 4-A and 4-B enclosed with the cover 2 and form the pump chamber. The sealing ring 12 adapted, in use, to provide a seal against the engine cylinder head. In the embodiment shown the rotor 5 is circular and the recess bisects the rotor 5. The rotor 5 is positioned in the casing 1 such that rotational axis thereof lies on a plane of symmetry of the casing 1. The rotor 5 is positioned on this plane such that the edge of the rotor 5 almost touches the casing 1. In the arrangement shown in FIG. 1, the rotor can be said to be positioned in an upper portion of the casing 1. The aforementioned plane of symmetry extends between top centre and bottom centre of the casing 1.

Figure 2:
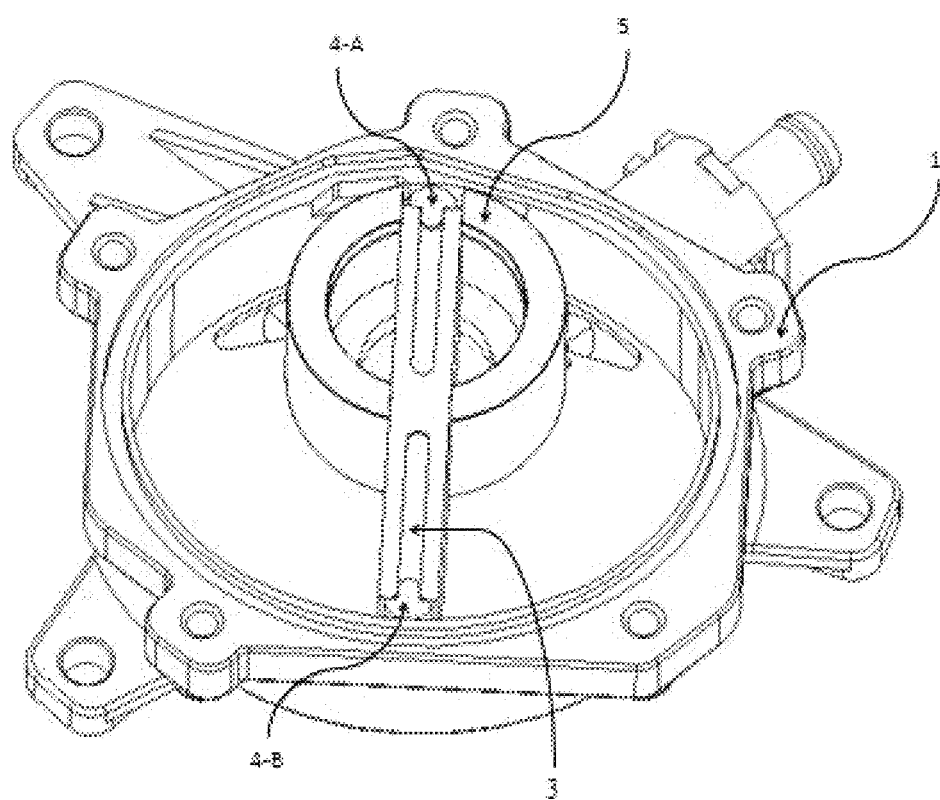
FIG. 2 is a top plan view of a vacuum pump in accordance with the present invention.

FIG. 2 shows the general internal placement of the rotor 5, vane 3 and the vane slider 4-A and 4-B inside the housing 1.

Figure 3:
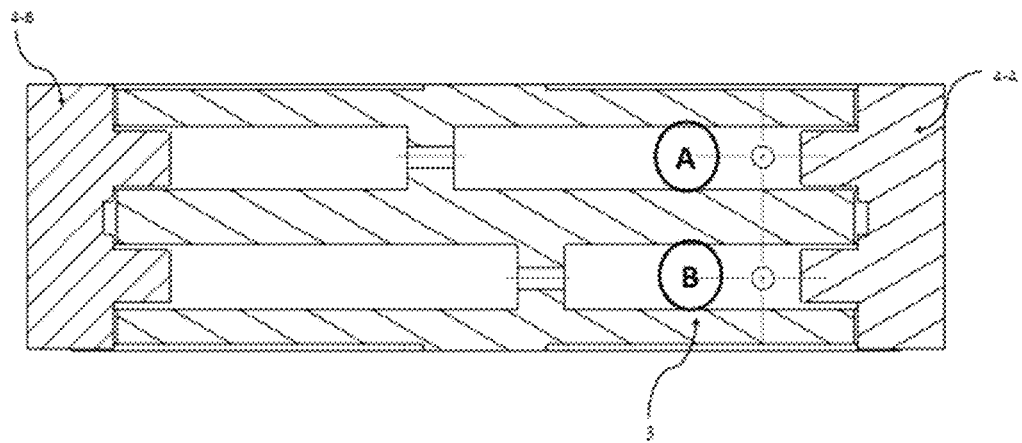
FIG. 3 shows a diagrammatic view of a vacuum pump vane according to the present invention.

As shown in FIG. 3, a diagrammatic view of a vacuum pump vane 3 according to the present invention is illustrated. The vane 3 having four holes A, B, C, D as illustrated in FIG. 3B. The holes A, B, C, D are named as pressure release hole which can be incorporated in one or more combinations in the pump to release the internal port chamber pressure. When the pump is working, there is a positive pressure generated which creates additional stress on the vane slider tip marked as 4-A and 4-B in FIG. 3B. To reduce the tip stress, the by-pass hole is introduced which allow the compressed oil to pass through the hole. Since the oil passes through the side surface of the vane 3 there is a sufficient lubrication between the stationary part and moving part which creates a proper sealing between the chambers and good vacuum with minimum air leakage.

Figure 4A:
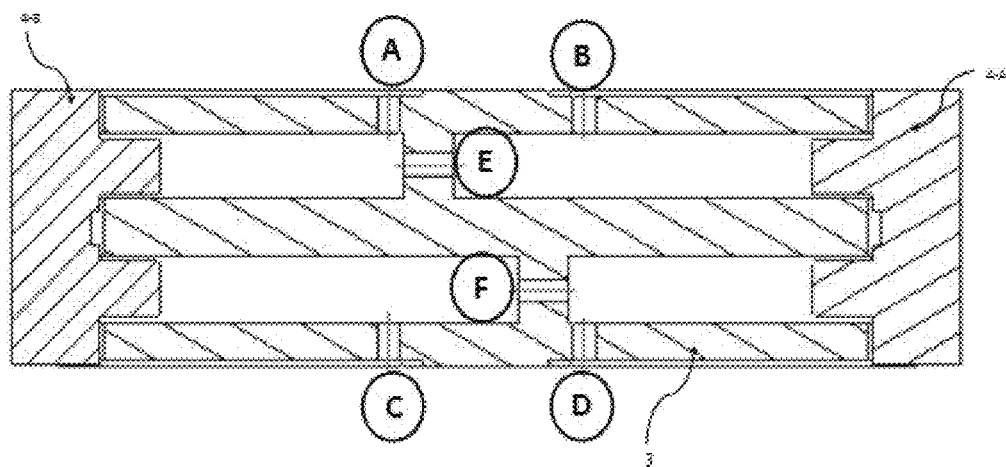
FIG. 4a shows a diagrammatic view of a vacuum pump vane according to an alternate embodiment of the present invention.

As shown in FIG. 4a, a diagrammatic view of a vacuum pump vane 3 according to an alternate embodiment of the present invention is illustrated. The vane 3 having six holes A, B, C, D, E, F. The holes A, B, C, D, E, F are named as pressure release hole which can be incorporated any one or more than one combination in the pump to release the internal port chamber pressure. During the pump working condition there is a positive pressure generated which creates additional stress on the vane slider 4-A and 4-B tip. To reduce the tip stress, the by-pass hole is introduced which allow the compressed oil pass through the hole. Since the oil passes through the top and bottom surface of the vane 3 there is a sufficient lubrication between the stationary part and moving part which creates a proper sealing between the chambers and good vacuum with minimum air leakage.

Figure 4B:
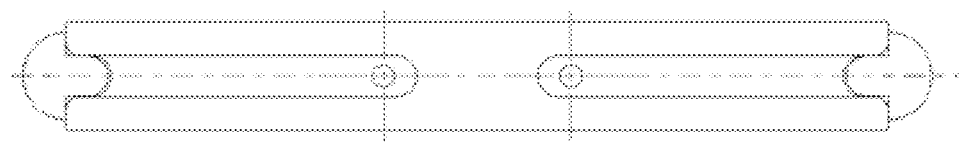
FIG. 4b shows a diagrammatic view of vane slider according to an alternate embodiment of the present invention.

FIG. 4b shows a diagrammatic view of vane slider according to an alternate embodiment of the present invention.

Figure 5:
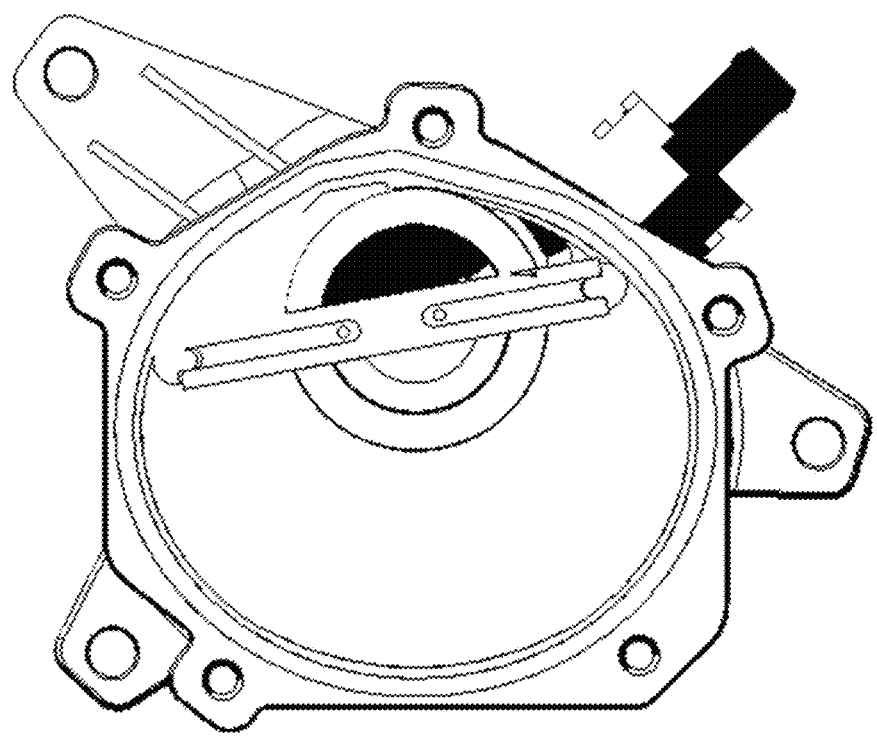
FIG. 5 shows a diagrammatic view of the compressed fluid inside the pump chamber.

As shown in FIG. 5, a diagrammatic view of the compressed fluid inside the pump chamber is illustrated.

Figure 6:
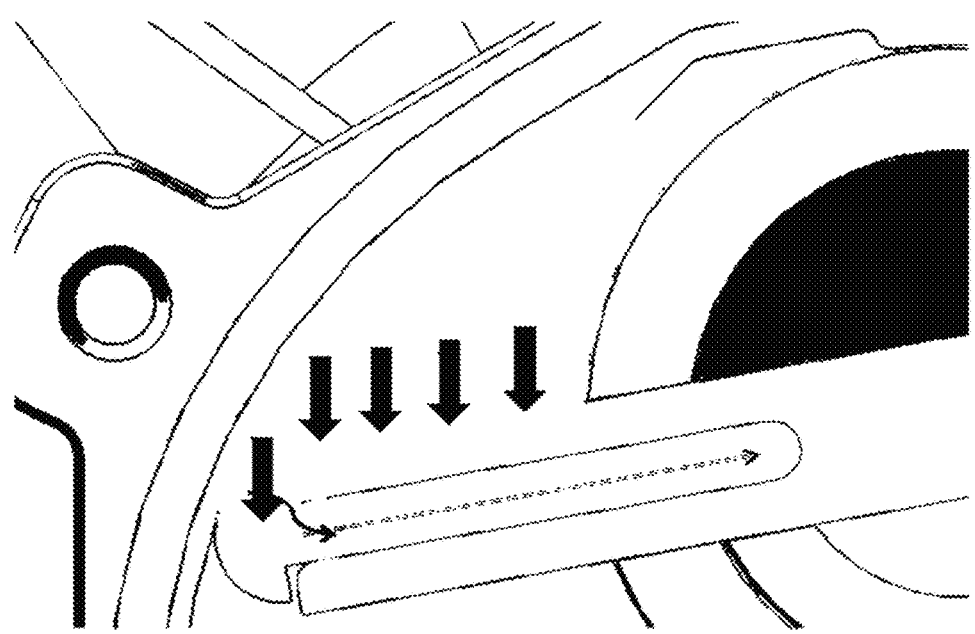
FIG. 6 shows the diagrammatic view of the fluid flow path during compressed condition.

As shown in FIG. 6, the diagrammatic view of the fluid flow path during compressed condition is illustrated.

Figure 7:
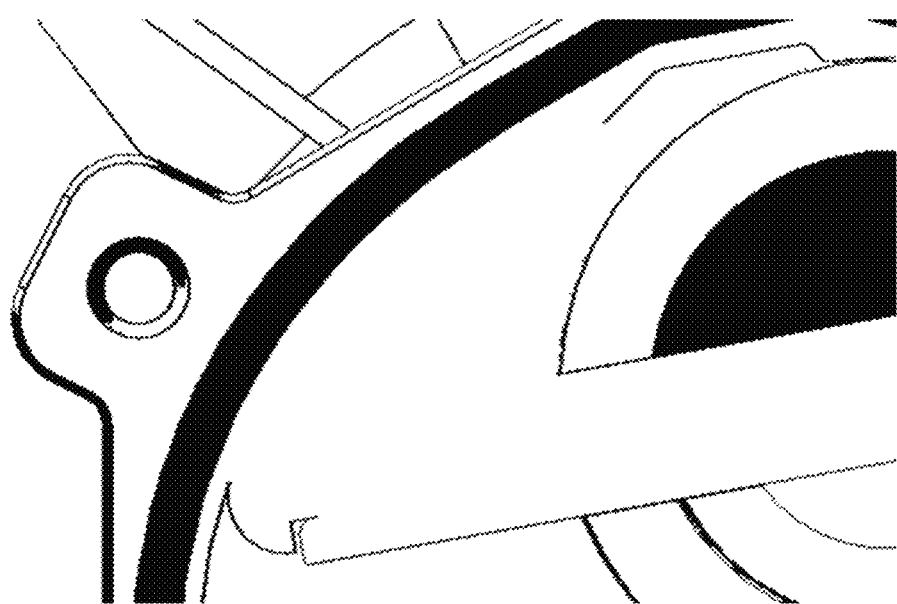
FIG. 7 shows diagrammatic views of the oil sealing between the stationary part and moving part.
Figure 8:
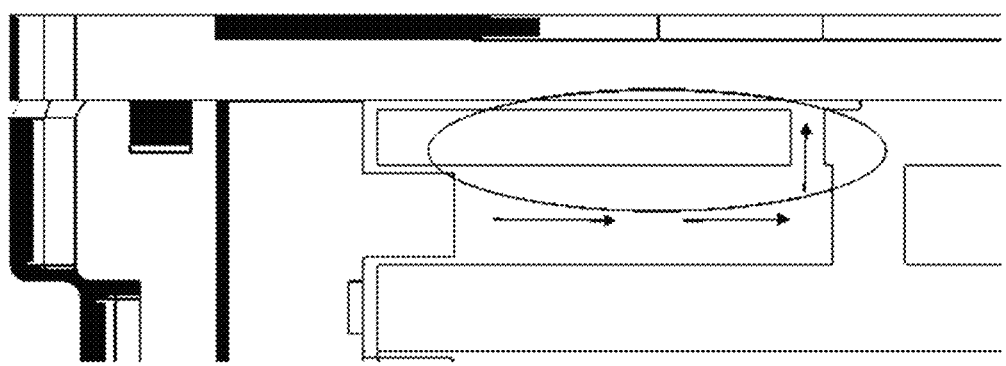
FIG. 8 shows diagrammatic views of the oil sealing between the stationary part and moving part.

FIG. 7 and FIG. 8 show diagrammatic views of the oil sealing between the stationary part and moving part. The detail X in FIG. 7 shows the diagrammatic representation of the additional oil film generated with this modified vane 3 which increases the pump efficiency. The hole can be anywhere on the top face, bottom face or both. The position shown in the drawing is only to show one possible position. The hole can also be anywhere along the side face of the vane 3.

Accordingly, the present disclosure proposes an improved vacuum pump assembly for a motor vehicle comprising of: a housing partially or fully enclosing the vacuum pump assembly; a rotor; a modified vane comprising a top face and a bottom face, a vane slider with at least one oil vent, the vane being slidably supported by the rotor in its recess; a sealing ring adapted to provide a seal against the engine cylinder head; and a cover to act as a lid on top of the rotor; wherein, the modified vane containing a vane slider is having at least one oil vent reduces the exit port oil peak pressure; the modified vane further channelizes oil supply to the vane top and bottom face, thereby improving the sealability between the moving and stationary parts of the pump; the modified vane having an oil vent at the exit port maintains the oil pressure and reduces the exit port hydraulic pressure resulting in low friction.

Further, the oil vent is present on the top face and alternately on the bottom face of the vane slider.

In an alternate embodiment, the modified vane comprises of vane slider having plurality of oil vents wherein the oil vents are present on the top face or bottom face or both the faces of the vane slider.

As shown in figures, the present invention utilizes the combined effects of less friction between the vane and the housing and distributed oil flow within the chamber and moving parts from the pressurized oil reservoir which results in less power consumption and running torque in more efficient and effective way over the existing vacuum pumps.

As shown in examples, the present invention utilizes the combined effects of less friction between the vane and the housing and optimized oil flow rate from the pressurized oil reservoir which results in less power consumption and running torque in more efficient and effective way over the existing vacuum pumps.

EXAMPLE 1

| Test Conditions | |
|---|---|
| Test Parameter | Test Specification |
| Oil Temperature | 100 ± 5° C. |
| Oil Flow Rate | 0.5 + 0.2 LPM |

Figure 9A:
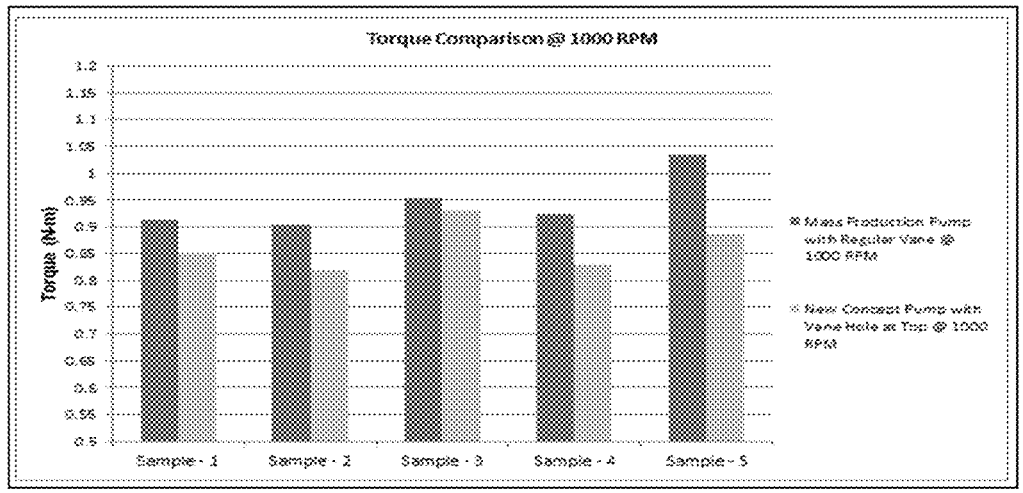
FIG. 9a and FIG. 9b showing the Vacuum Response of Mass Production and the new concept pump with Vane Hole at Edge which is approximately same.
Figure 9B:
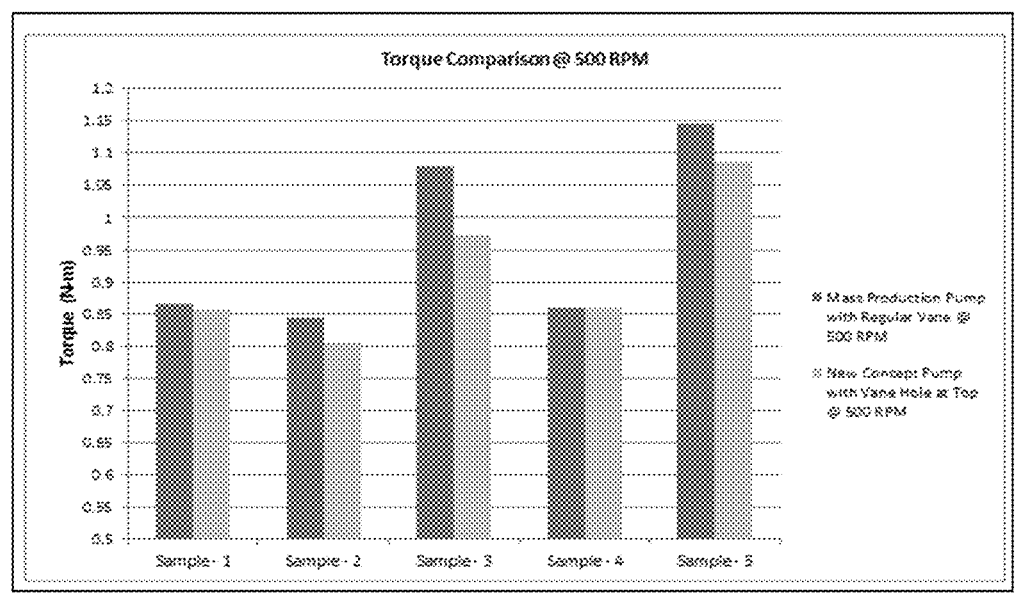

FIGS. 9a and 9b showing the Vacuum Response of Mass Production and the new concept pump with Vane Hole at Edge which is approximately same.

EXAMPLE 2

| Test Conditions | | | |
|---|---|---|---|
| Test Parameter | Test Specification | Test Parameter | Test Specification |
| Pump Speed | 375 RPM | Oil Temperature | 100 ± 5° C. |
| Brake Booster Volume | 2.5 L | Oil Flow Rate | 0.5 + 0.2 LPM |

Figure 10:
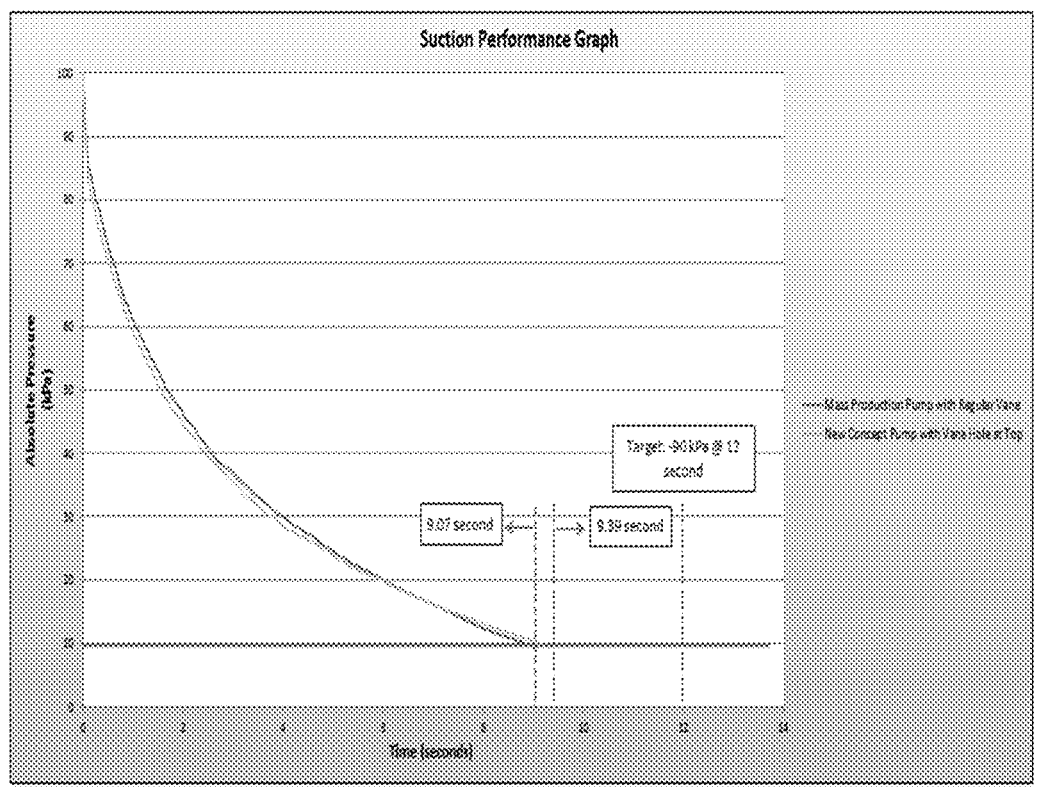
FIG. 10 showing the Torque Comparison at 500 RPM and 1000 RPM wherein the five sample pumps with Vane hole at the edge show considerable decrease in Torque as compared to the conventional pumps.

FIG. 10 showing the Torque Comparison at 500 RPM and 1000 RPM wherein the five sample pumps with Vane hole at the edge show considerable decrease in Torque as compared to the conventional pumps.

EXAMPLE 3

| Test Conditions | |
|---|---|
| Test Parameter | Test Specification |
| Oil Temperature | 100 ± 5° C. |
| Oil Flow Rate | 0.5 + 0.2 LPM |

Figure 11A:
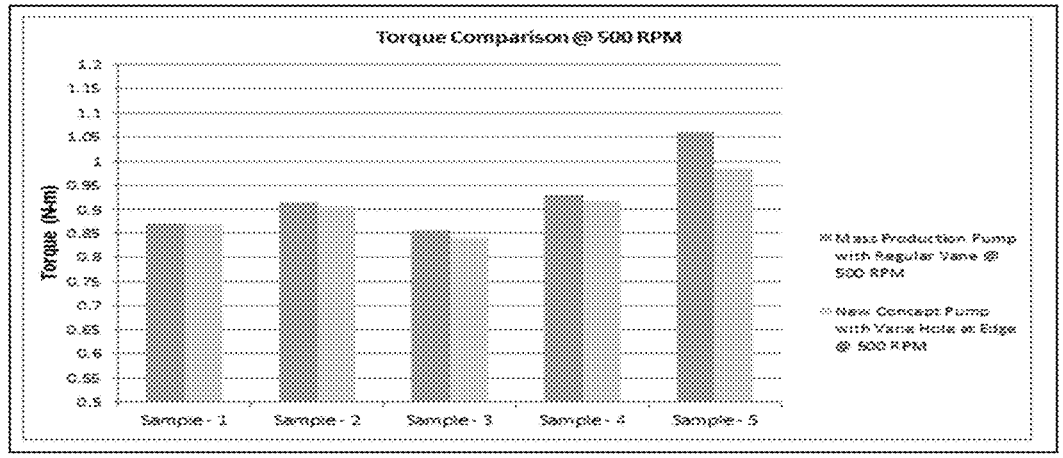
FIG. 11a and FIG. 11b showing the Vacuum Response of Mass Production and the new concept pump with Vane Hole at Edge which is approximately same.
Figure 11B:
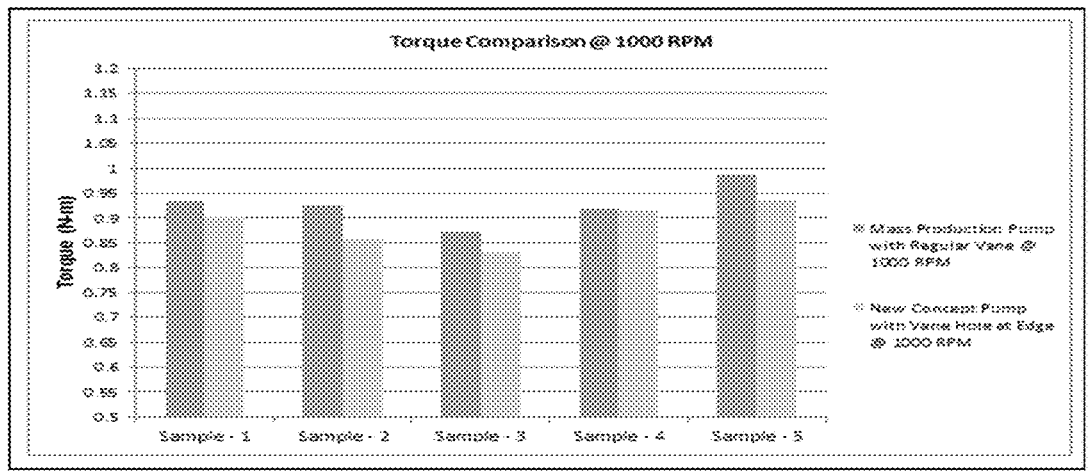

FIGS. 11a and 11b showing the Vacuum Response of Mass Production and the new concept pump with Vane Hole at Edge which is approximately same.

EXAMPLE 4

| Test Conditions | | | |
|---|---|---|---|
| Test Parameter | Test Specification | Test Parameter | Test Specification |
| Pump Speed | 375 RPM | Oil Temperature | 100 ± 5° C. |
| Brake Booster Volume | 2.5 L | Oil Flow Rate | 0.5 + 0.2 LPM |

While the best mode has been described in detail, those familiar with the art will recognize various alternative designs and examples within the scope of the following claims.

We claim:

1. An improved vacuum pump assembly for a motor vehicle comprising of:
    a. a housing partially or fully enclosing the vacuum pump assembly;
    b. a rotor;
    c. a modified vane comprising a top face and a bottom face, a vane slider with at least one oil vent, the modified vane being slidably supported by the rotor in its recess;
    d. a sealing ring adapted to provide a seal against engine cylinder head; and
    e. a cover to act as a lid on top of the rotor;
    wherein,
    the modified vane containing said vane slider is having at least one oil vent reduces the exit port oil peak pressure;
    the modified vane further channelizes oil supply to the vane top and bottom face, thereby improving the sealability between the moving and stationary parts of the pump; and the modified vane having an oil vent at the exit port maintains the oil pressure and reduces the exit port hydraulic pressure resulting in low friction.

2. The vacuum pump assembly as claimed in the claim 1, wherein the oil vent is present on the top face of the vane slider.

3. The vacuum pump assembly as claimed in the claim 1, wherein the oil vent is present on the bottom face of the vane slider.

4. The vacuum pump assembly as claimed in the claim 1, wherein the modified vane alternately comprises of vane slider having plurality of oil vents.

5. The vacuum pump assembly as claimed in the claim 4, wherein the oil vents are present on the top face or bottom face or both the faces of the vane slider.

6. The vacuum pump assembly as claimed in the claim 1, wherein the reduction of pump exit port pressure and the power required for pump operation results into increase in the engine fuel economy.

7. The vacuum pump assembly as claimed in the claim 1, wherein the modified assembly results into reduction of peak pressure ultimately reducing peak torque.

8. The vacuum pump assembly as claimed in the claim 7, wherein the reduced peak torque results in reduction of total power consumption of the pump.

\* \* \* \* \*